(12) United States Patent
An et al.

(10) Patent No.: US 10,174,670 B2
(45) Date of Patent: Jan. 8, 2019

(54) MULTI-STAGE ELECTRIC CENTRIFUGAL COMPRESSOR AND SUPERCHARGING SYSTEM FOR INTERNAL COMBUSTION ENGINE

(71) Applicant: MITSUBISHI HEAVY INDUSTRIES ENGINE & TURBOCHARGER, LTD., Sagamihara-shi, Kanagawa (JP)

(72) Inventors: Byeongil An, Tokyo (JP); Hiroshi Suzuki, Tokyo (JP)

(73) Assignee: MITSUBISHI HEAVY INDUSTRIES ENGINE & TURBOCHARGER, LTD., Sagamihara-Shi, Kanagawa (JP)

(*) Notice: Subject to any disclaimer, the term of this patent is extended or adjusted under 35 U.S.C. 154(b) by 145 days.

(21) Appl. No.: 15/113,137

(22) PCT Filed: Feb. 25, 2014

(86) PCT No.: PCT/JP2014/054506
§ 371 (c)(1),
(2) Date: Jul. 21, 2016

(87) PCT Pub. No.: WO2015/128936
PCT Pub. Date: Sep. 3, 2015

(65) Prior Publication Data
US 2017/0002727 A1 Jan. 5, 2017

(51) Int. Cl.
*F02B 33/44* (2006.01)
*F02B 33/00* (2006.01)
(Continued)

(52) U.S. Cl.
CPC .............. *F02B 37/12* (2013.01); *F02B 33/40* (2013.01); *F02B 37/04* (2013.01); *F02B 39/10* (2013.01);
(Continued)

(58) Field of Classification Search
CPC .......... F02B 37/12; F02B 37/04; F02B 33/40; F02B 39/10; F02B 2037/122; F04D 17/12;
(Continued)

(56) References Cited

U.S. PATENT DOCUMENTS 4,105,372 A * 8/1978 Mishina .................. F04D 17/12
417/243
6,029,452 A * 2/2000 Halimi .................... F02B 39/10
60/608

(Continued)

FOREIGN PATENT DOCUMENTS

CN     102667096 A      9/2012
DE   10 2009 042 283 A1  3/2011
(Continued)

OTHER PUBLICATIONS

Office Action effective Apr. 21, 2017 issued in the corresponding CN Application No. 201480069105.0 with a Machine English Translation.
(Continued)

*Primary Examiner* — Thai Ba Trieu
(74) *Attorney, Agent, or Firm* — Birch, Stewart, Kolasch & Birch, LLP

(57) ABSTRACT

A multi-stage electric centrifugal compressor and a supercharging system for an internal combustion engine with a driving unit of a rotational shaft that can be readily controlled when a single-shaft and two-stage centrifugal compressor is employed is provided. A multi-stage electric centrifugal compressor includes: an electric motor; and a pair of centrifugal compressors coupled to either side of the electric motor, the pair of centrifugal compressors comprising a low-pressure stage compressor and a high-pressure stage compressor connected in series. The low-pressure
(Continued)

stage compressor and the high-pressure stage compressor are formed to have different pressure ratios from each other.

5 Claims, 2 Drawing Sheets

(51) Int. Cl.
*F02B 37/12* (2006.01)
*F02B 37/04* (2006.01)
*F04D 17/12* (2006.01)
*F04D 25/06* (2006.01)
*F02B 33/40* (2006.01)
*F02B 39/10* (2006.01)
*F04D 27/00* (2006.01)
*F04D 29/28* (2006.01)

(52) U.S. Cl.
CPC ............ *F04D 17/12* (2013.01); *F04D 25/06* (2013.01); *F04D 27/004* (2013.01); *F04D 29/284* (2013.01); *F02B 2037/122* (2013.01); *F05D 2220/40* (2013.01); *Y02T 10/144* (2013.01)

(58) Field of Classification Search
CPC ...... F04D 25/06; F04D 27/004; F04D 29/284; F04D 2220/40; F05D 2220/40; Y02T 10/144
USPC .................. 60/608, 607, 609, 612; 123/562; 417/243–244, 423.5, 423.7–423.8
See application file for complete search history.

(56) References Cited

U.S. PATENT DOCUMENTS

| | | | | |
|---|---|---|---|---|
| 6,079,211 A * | 6/2000 | Woollenweber | ........ | F02B 39/10 60/608 |
| 6,193,473 B1 * | 2/2001 | Mruk | ...................... | F04D 17/12 417/423.7 |
| 6,234,749 B1 * | 5/2001 | Hasegawa | ............. | F04D 29/083 417/244 |
| 6,616,421 B2 * | 9/2003 | Mruk | ...................... | F04D 25/06 417/423.7 |
| 6,957,535 B2 * | 10/2005 | Sumser | ................... | F02B 39/10 60/608 |
| 2012/0266595 A1 | 10/2012 | Buschur et al. | | |
| 2015/0275920 A1 * | 10/2015 | Thompson | .............. | F04D 25/06 417/423.8 |
| 2015/0308456 A1 * | 10/2015 | Thompson | .............. | F04D 17/12 417/244 |
| 2016/0186764 A1 * | 6/2016 | Lissoni | ................... | F04D 25/06 417/53 |
| 2016/0305450 A1 * | 10/2016 | An | .......................... | F04D 25/06 |

FOREIGN PATENT DOCUMENTS

| | | |
|---|---|---|
| EP | 1 316 447 A2 | 6/2003 |
| EP | 1 749 992 A1 | 2/2007 |
| GB | 2490942 A | 11/2012 |
| JP | 4-159422 A | 6/1992 |
| JP | 2001-234706 A | 8/2001 |
| JP | 2002-364571 A | 12/2002 |
| JP | 2004-11440 A | 1/2004 |
| JP | 2004-76659 A | 3/2004 |
| JP | 2005-171844 A | 6/2005 |
| JP | 2006-105034 A | 4/2006 |
| JP | 2008-151051 A | 7/2008 |
| JP | 2009-520141 A | 5/2009 |
| JP | 4497809 B2 | 7/2010 |
| JP | 2013-24059 A | 2/2013 |

OTHER PUBLICATIONS

Office Action effective Nov. 16, 2017 issued to the corresponding JP Application No. 2016-504885 with an English Translation.
Office Action dated Jun. 30, 2017 issued to the corresponding JP Application No. 2016-504885 with an English Translation.
Extended European Search Report effective Nov. 17, 2016 issued in the corresponding EP Application No. 14884028.3.
International Preliminary Report on Patentability and the Written Opinion of the International Searching Authority (Forms PCT/IB/326, PCT/IB/338, PCT/IB/373 and PCT/ISA/237) dated Sep. 9, 2016, for International Application No. PCT/JP2014/054506 with the English translation.
International Search Report (Forms PCT/ISA/210 and PCT/ISA/220) dated Apr. 28, 2014, for International Application No. PCT/JP2014/054506.
2nd Office Action effective Jan. 2, 2018 issued to the corresponding Chinese Application No. 201480069105.0 with an English Translation.
Chinese Office Action, dated Jul. 25, 2018, for Chinese Application No. 201480069105.0, along with an English translation.
Japanese Office Action, dated Jun. 29, 2018, for Japanese Application No. 2016-504885, along with an English translation.

* cited by examiner

MULTI-STAGE ELECTRIC CENTRIFUGAL COMPRESSOR AND SUPERCHARGING SYSTEM FOR INTERNAL COMBUSTION ENGINE

TECHNICAL FIELD

The present disclosure relates to a multi-stage electric centrifugal compressor and a supercharging system of an internal combustion engine equipped with the multi-stage electric centrifugal compressor.

BACKGROUND ART

An engine, which is an example of an internal combustion engine, has been reduced in size, and there are growing needs for an increased low-speed torque and improved responsiveness. An electric centrifugal compressor is attracting attention as an approach to meet such needs. There is a system including a multi-stage electric centrifugal compressor including such an electric compressor, with a low-pressure stage turbocharger disposed in an intake passage and an exhaust passage of an engine, and an electric compressor disposed in the intake passage downstream of a low-pressure stage compressor of the low-pressure stage turbocharger (see Patent Document 1).

This electric two-stage system is configured to perform supercharging in two stages: the first-stage supercharging by the low-pressure stage turbocharger, and the second-stage supercharging by the electric compressor.

The low-pressure stage turbocharger includes a low-pressure stage turbine disposed in the exhaust passage and driven by exhaust gas, and a low-pressure stage compressor disposed in the intake passage and driven by rotational torque of the low-pressure stage turbine. The electric compressor is disposed in the intake passage on the downstream side of the low-pressure stage compressor, and includes a high-pressure stage compressor driven by rotational torque of the electric motor.

In the above electric two-stage system, if the engine is operating in a range of low-speed rotation, the electric compressor is driven to increase the rotation speed of the high-pressure stage compressor to assist supercharging of intake air by the low-pressure stage compressor, which prevents delay in supercharging and enables improvement of low-speed torque and responsiveness.

CITATION LIST

Patent Literature

Patent Document 1: JP2013-24059A (see FIG. 6)
Patent Document 2: JP2004-11440A

SUMMARY

Problems to be Solved

In recent years, besides a turbo assist function for the purpose of improvement of responsiveness at a low engine speed, turbo assist is also required during normal operation, which makes a usage environment of engines increasingly severe. Thus, if a typical electric two-stage system is used to meet such requirements, an electric compressor needs to rotate at a higher speed, which may shorten the lifetime of the electric compressor.

In view of this, a single-shaft and two-stage centrifugal compressor disclosed in Patent Document 2 can be employed. However, the centrifugal compressor rotates at a high speed, which may raise a risk of difficulty in control of a driving unit for operating the centrifugal compressor, due to influence from inertia generated by rotation of a low-pressure stage compressor disposed on one end side of a rotary shaft of the centrifugal compressor and inertia generated by rotation of a high-pressure stage compressor disposed on the other end side of the rotary shaft.

Further, in Patent Document 2, compressors of the same configuration are used as the low-pressure stage compressor and the high-pressure stage compressor of the single-shaft and two-stage centrifugal compressor depicted in drawings. Thus, the low-pressure stage compressor and the high-pressure stage compressor have the same supercharging characteristics, which may lead to a rapid increase in a pressure ratio from a certain rotation speed, raising a risk of difficulty in control of the pressure ratio.

In view of this, an object of at least some embodiments of the present invention is to provide a multi-stage electric centrifugal compressor and a supercharging system for an internal combustion engine with a driving unit of a rotational shaft and a pressure ratio that can be readily controlled when a single-shaft and two-stage centrifugal compressor is employed.

Solution to the Problems

A multi-stage electric centrifugal compressor according to some embodiments of the present invention comprises: an electric motor; a rotary shaft; an impeller of a low-pressure stage compressor connected to one end side of the rotary shaft; an impeller of a high-pressure stage compressor connected to the other end side of the rotary shaft, the high-pressure stage compressor being configured to re-compress intake air compressed by the low-pressure stage compressor. The low-pressure stage compressor and the high-pressure stage compressor are formed so that intake air compressed by rotation of the impeller of the low-pressure stage compressor and intake air compressed by rotation of the impeller of the high-pressure stage compressor have different pressure ratios from each other.

In the multi-stage electric centrifugal compressor, the low-pressure stage compressor and the high-pressure stage compressor are formed so that intake air compressed by rotation of the impeller of the low-pressure stage compressor and intake air compressed by rotation of the impeller of the high-pressure stage compressor have different pressure ratios, and thus, when the impellers of the low-pressure stage compressor and the high-pressure stage compressor rotate, a difference in inertia between the compressor with a larger pressure ratio and the compressor with a smaller pressure ratio may be an inertia that acts on the rotational shaft due to a braking effect, and thereby inertia is reduced. Thus, it is possible to obtain a multi-stage electric centrifugal compressor capable of readily controlling rotation of the electric motor.

Moreover, with the above multi-stage electric centrifugal compressor, the low-pressure stage compressor and the high-pressure stage compressor are formed so that intake air compressed by rotation of the impeller of the low-pressure stage compressor and intake air compressed by rotation of the impeller of the high-pressure stage compressor have different pressure ratios, and thus, by utilizing a difference in supercharging efficiency between the low-pressure stage compressor and the high-pressure stage compressor at a certain rotation speed, it is possible to differentiate change rates of respective pressure ratios of the low-pressure stage compressor and the high-pressure stage compressor when the rotation speed is increased or decreased from the certain rotation speed, and to change the pressure ratio of the multi-stage electric centrifugal compressor gradually. Thus, it is possible to obtain a multi-stage electric compressor capable of readily performing an optional pressure-ratio control.

In some embodiments, a diameter of an impeller of the low-pressure stage compressor is different from a diameter of an impeller of the high-pressure stage compressor.

In this case, the impellers of the low-pressure stage compressor and the high-pressure stage compressor have different diameters from each other, and thus it is possible to readily differentiate pressure ratios of intake air compressed by the low-pressure stage compressor and intake air compressed by the high-pressure stage compressor. Thus, it is possible to further reduce inertia that acts on the rotational shaft when the impellers of the low-pressure stage compressor and the high-pressure stage compressor rotate. Thus, it is possible to obtain a multi-stage electric centrifugal compressor capable of readily controlling rotation of the electric motor.

Further, in this case, the impellers of the low-pressure stage compressor and the high-pressure stage compressor have different diameters from each other, and thus it is possible to readily differentiate pressure ratios of intake air compressed by the low-pressure stage compressor and intake air compressed by the high-pressure stage compressor. Thus, it is possible to further smooth a change in a pressure ratio of the multi-stage electric centrifugal compressor due to an increase or a decrease in the rotation speed of the impellers of the low-pressure stage compressor and the high-pressure stage compressor. Thus, it is possible to obtain a multi-stage electric compressor capable of readily performing an optional pressure-ratio control.

In some embodiments, a shape of an impeller of the low-pressure stage compressor is different from a shape of an impeller of the high-pressure stage compressor.

In this case, the impellers of the low-pressure stage compressor and the high-pressure stage compressor have different shapes, and thus it is possible to adjust a range of a flow path of intake air flowing through the compressors. Thus, it is possible to readily differentiate pressure ratios of intake air compressed by the low-pressure stage compressor and intake air compressed by the high-pressure stage compressor. Thus, it is possible to further reduce inertia that acts on the rotational shaft when the impellers of the low-pressure stage compressor and the high-pressure stage compressor rotate. Thus, it is possible to obtain a multi-stage electric compressor capable of readily controlling rotation of the electric motor.

Further, in this case, the impellers of the low-pressure stage compressor and the high-pressure stage compressor have different diameters from each other, and thus it is possible to readily differentiate pressure ratios of intake air compressed by the low-pressure stage compressor and intake air compressed by the high-pressure stage compressor. Thus, it is possible to further smooth a change in a pressure ratio of the multi-stage electric centrifugal compressor due to an increase or a decrease in the rotation speed of the impellers of the low-pressure stage compressor and the high-pressure stage compressor. Thus, it is possible to obtain a multi-stage electric compressor capable of readily performing an optional pressure-ratio control.

In some embodiments, the multi-stage electric centrifugal compressor further comprises: a map defining a relationship of a rotation speed of the electric motor to a discharge pressure or a discharge flow rate of the multi-stage electric centrifugal compressor; a matching unit configured to match the map with an intake pressure or an intake flow rate required for the multi-stage centrifugal compressor by an upper-level controller configured to control operation of an internal combustion engine to derive a required rotation speed of the electric motor; and a controller configured to control the rotation speed of the electric motor to achieve the required rotation speed derived by the matching unit.

In this case, the control unit controls the rotation speed of the electric motor so as to achieve the required rotation speed derived by the matching unit, and thus it is possible to match an intake pressure or an intake flow rate of the multi-stage centrifugal compressor to an intake pressure or an intake flow rate required by an upper-level controller. Thus, it is possible to achieve improvement of responsiveness during low-speed operation of an internal combustion engine and an assist function of another supercharger, as well as facilitated control of rotation speed of the rotational shaft with the electric motor when assist for another supercharger is required also during normal operation.

A supercharging system of an internal combustion engine according to some embodiments of the present invention includes the multi-stage electric centrifugal compressor described above. A discharge side of the multi-stage electric centrifugal compressor described above is connected to an intake side of another supercharger, and discharged air of the multi-stage electric centrifugal compressor is taken into an intake side of a centrifugal compressor of the turbocharger.

In this case, the multi-stage electric centrifugal compressor can control rotation of the electric motor readily, and thus it is possible to achieve improvement of responsiveness during low-speed operation of the engine and an assist function of another supercharger, as well as facilitated control of rotation speed of the rotational shaft with the electric motor when assist for another supercharger is required also during normal operation. Thus, intake air corresponding to demand can be supplied to the internal combustion engine via another supercharger. Further, the multi-stage electric centrifugal compressor further supplies intake air compressed by the low-pressure stage compressor to the high-pressure stage compressor to further compress the intake air, and thus intake air with an even higher pressure ratio can be obtained as compared to a supercharger with a compressor disposed only on one end portion of a rotational shaft. Thus, even if the maximum rotation speed of the multi-stage electric centrifugal compressor is reduced, it is possible to achieve a supercharging system of an internal combustion engine capable of supercharging desired intake air.

In some embodiments, the other supercharger comprises an exhaust turbine rotated by exhaust gas of an internal combustion engine and the centrifugal compressor rotated by rotation of the exhaust turbine.

In this case, with the other supercharger being a turbocharger including an exhaust turbine rotated by exhaust gas of the internal combustion engine, and a centrifugal compressor which rotates in response to rotation of the exhaust turbine, intake air is compressed with three-stage compressors, and thereby it is possible to supply intake air with an even higher pressure to the internal combustion engine than in a case two-stage compressors are used to compress intake air. Thus, even if the rotation speed of the multi-stage electric centrifugal compressor is reduced, it is possible to achieve a desired pressure for intake air to be supercharged to the internal combustion engine. Accordingly, it is possible to prevent a decrease in the lifetime of the multi-stage electric centrifugal compressor.

Advantageous Effects

According to at least some embodiments of the present invention, it is possible to provide a multi-stage electric centrifugal compressor and a supercharging system for an internal combustion engine with a driving unit of a rotational shaft and a pressure ratio that can be readily controlled when a single-shaft and two-stage centrifugal compressor is employed.

DETAILED DESCRIPTION

Embodiments of a multi-stage electric centrifugal compressor and a supercharging system of an internal combustion engine of the present invention will now be described with reference to FIGS. 1 and 2. First, a multi-stage electric centrifugal compressor will be described. It is intended, however, that unless particularly specified, dimensions, materials, shapes, relative positions and the like of components described in the embodiments shall be interpreted as illustrative only and not intended to limit the scope of the present invention.

Figure 1:
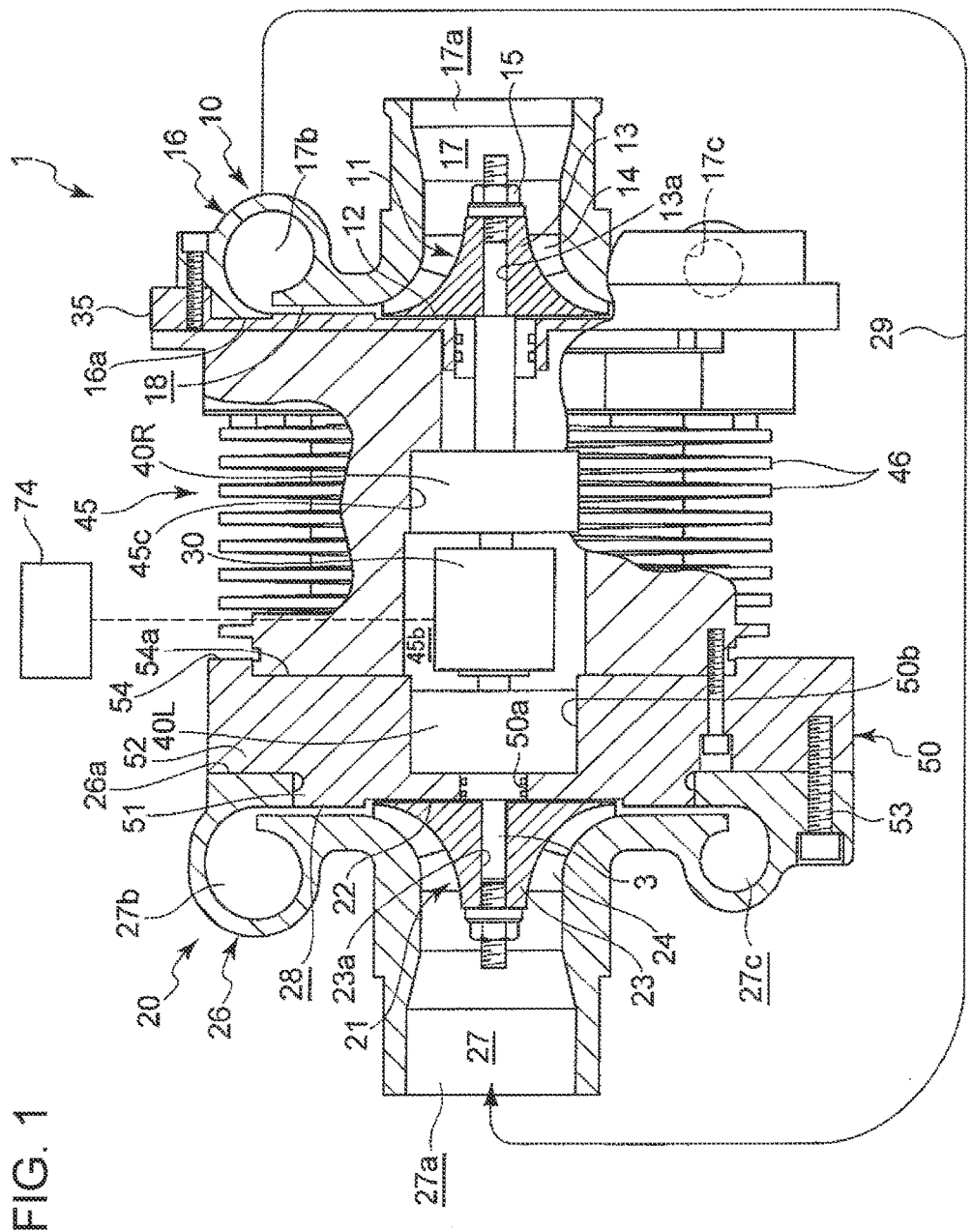
FIG. 1 is a cross sectional view of a multi-stage electric centrifugal compressor.
Figure 2:
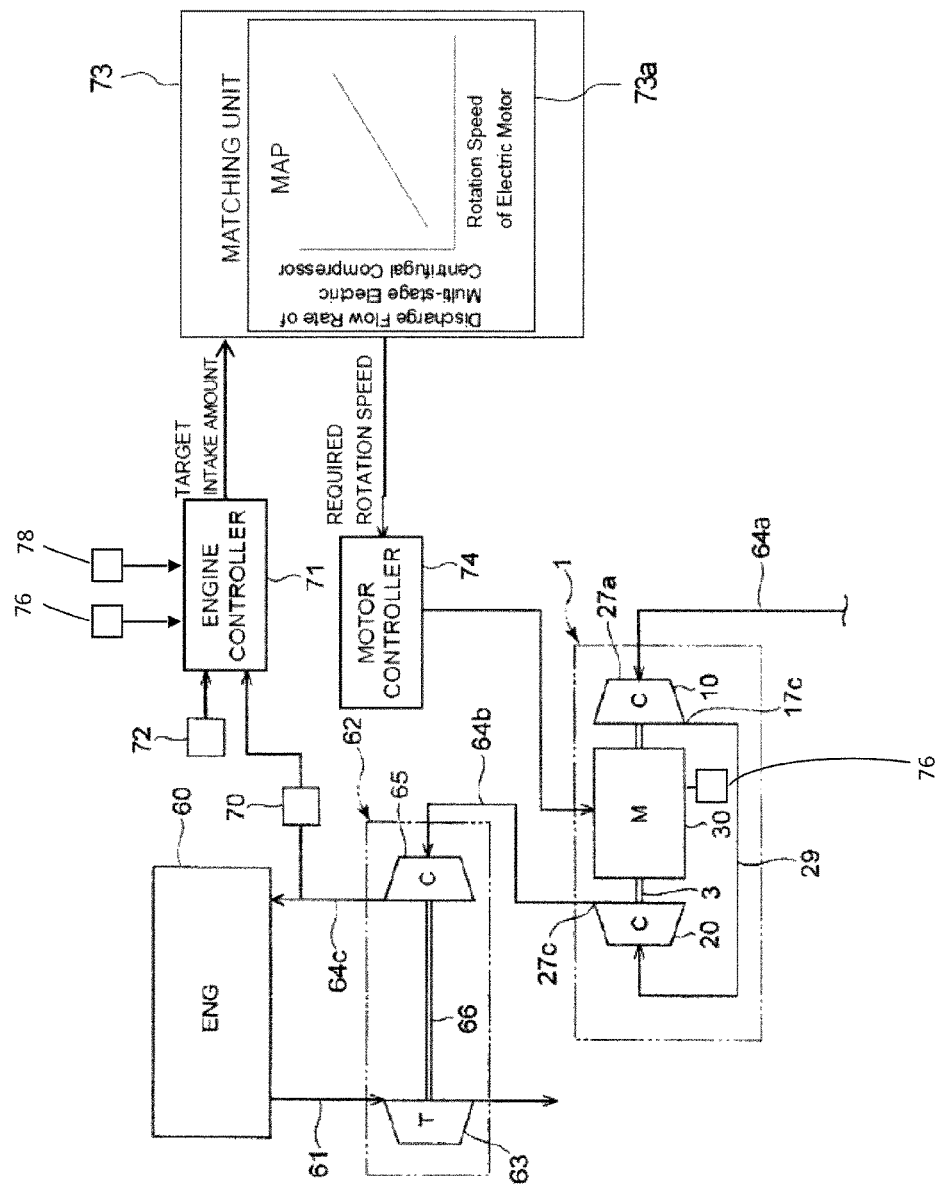
FIG. 2 is a schematic configuration diagram of a supercharging system of an internal combustion engine equipped with the multi-stage electric centrifugal compressor.

As depicted in FIG. 1 (cross-sectional view), the multi-stage electric centrifugal compressor 1 includes a rotational shaft 3 supported rotatably, a low-pressure stage compressor 10 including a low-pressure stage impeller 11 mounted to the first end of the rotational shaft 3, a high-pressure stage compressor 20 including a high-pressure stage impeller 21 mounted to the second end of the rotational shaft 3, and an electric motor rotor 30 mounted to a middle section of the rotational shaft 3 in a longitudinal direction. It should be noted that an electric motor stator (not depicted) is disposed around the electric motor rotor 30 so as to surround the electric motor rotor 30, so that the electric motor rotor 30 and the electric motor stator make up an electric motor (not depicted).

The low-pressure stage compressor 10 includes the low-pressure stage impeller 11 mounted to the first end side of the rotational shaft 3, and a low-pressure stage housing 16 surrounding the low-pressure stage impeller 11. The low-pressure stage housing 16 defines a space part 17 that accommodates the low-pressure stage impeller 11 rotatably. An inlet 17a for intake of intake air is disposed on the first end side of the middle section of the space part 17, and a flow channel 17c is formed in a radial direction of the space part 17, the flow channel 17c communicating with the inlet 17a and curving in the circumferential direction of the low-pressure stage compressor 10. Further, an outlet 17b communicating with the flow channel 17c is disposed on an end portion on one side in the width direction of the low-pressure stage housing 16, i.e., on an end portion in front of the page of FIG. 1. Intake air enters through the inlet 17a, has its temperature increased by being compressed by the low-pressure stage impeller 11, flows through the flow channel 17c, and then exits through the outlet 17b.

An insertion opening 18 of a circular shape is disposed on the second end side of the low-pressure stage housing 16 in a side view, and the low-pressure stage impeller 11 can be inserted into the insertion opening 18. The insertion opening 18 is an opening larger than the low-pressure stage impeller 11, so that a part of the flow channel 17c is exposed. A side face 16a of the low-pressure stage housing 16 on the side of the insertion opening 18 has a flat shape and is formed in an annular shape in a side view.

A back plate 35 is disposed on the second end side of the low-pressure stage housing 16, being mounted to the side face 16a of the low-pressure stage housing 16 so as to close the flow channel 17c which is exposed. A motor housing 45 which retains the electric motor rotor 30 and a bearing 40R is mounted to a side of the back plate 35 that is facing the high-pressure stage compressor 20. The motor housing 45 will be described below in detail.

The low-pressure stage impeller 11 includes a back plate 12 of a disc shape, a boss portion 13 formed into a truncated conical shape and disposed integrally with the back plate 12 so as to protrude from a surface of the back plate 12 in a direction orthogonal to the surface of the back plate 12, and a plurality of vanes 14 formed in a radially protruding fashion from an outer circumferential surface of the boss portion 13 to the back plate 12. A through hole 13a is disposed through the center of the boss portion 13, and the rotational shaft 3 is inserted into the through hole 13a, and thereby the low-pressure stage impeller 11 is mounted to the rotational shaft 3 via a nut 15. The low-pressure stage impeller 11 has a diameter smaller than that of a high-pressure stage impeller 21 of a high-pressure stage compressor 20, which will be described below. Thus, the low-pressure stage compressor 10 has a smaller pressure ratio than the high-pressure stage compressor 20. The diameter of the high-pressure stage impeller 21 may be smaller than the diameter of the low-pressure stage impeller 11. In that case, the high-pressure stage compressor 20 has a smaller pressure ratio than that of the low-pressure stage compressor 10.

The high-pressure stage compressor 20 has a configuration similar to that of the low-pressure stage compressor 10, and includes the high-pressure stage impeller 21 mounted to the second end side of the rotational shaft 3, and a high-pressure stage housing 26 surrounding the high-pressure stage impeller 21. The high-pressure stage housing 26 defines a space part 27 that accommodates the high-pressure stage impeller 21 rotatably. An inlet 27a for intake of intake air is disposed on the second end side of the space part 27, and a flow channel 27c is formed in a radial direction of the space part 27, the flow channel 27c communicating with the inlet 27a and curving in the circumferential direction of the high-pressure stage compressor 20. Further, an outlet 27b communicating with the flow channel 27c is disposed on an end portion on one side in the width direction of the high-pressure stage housing 26, i.e., on an end portion in front of the page of FIG. 1. Intake air enters through the inlet 27a, has its temperature increased by being compressed by the high-pressure stage impeller 21, flows through the flow channel 27c, and then exits through the outlet 27b. The inlet 27a of the high-pressure stage housing 26 is in communication with the outlet 17b of the low-pressure stage housing 16 via an intake-air communication passage 29.

An insertion opening 28 of a circular shape is disposed on the first end side of the high-pressure stage housing 26 in a side view, and the high-pressure stage impeller 21 can be inserted into the insertion opening 28. The insertion opening 28 is an opening larger than the high-pressure stage impeller 21, so that a part of the flow channel 27c is exposed. A side face 26a of the high-pressure stage housing 26 on the side of the insertion opening 28 has a flat shape and is formed in an annular shape in a side view.

The high-pressure stage impeller 21 has a configuration similar to that of the low-pressure stage impeller 11, and includes a back plate 22 of a disc shape, a boss portion 23 formed into a truncated conical shape and disposed integrally with the back plate 22 so as to protrude from a surface of the back plate 22 in a direction orthogonal to the surface of the back plate 22, and a plurality of vanes 24 formed in a radially protruding fashion from an outer circumferential surface of the boss portion 23 to the back plate 22. A through hole 23a is disposed through the center of the boss portion 23, and the second end side of the rotational shaft 3 is inserted into the through hole 23a, and thereby the high-pressure stage impeller 21 is mounted to the second end side of the rotational shaft 3 via a nut 15. Accordingly, the low-pressure stage impeller 11 is mounted to the first end side of the rotational shaft 3, and the high-pressure stage impeller 21 is mounted to the second end side of the rotational shaft 3, so that the low-pressure stage impeller 11 and the high-pressure stage impeller 21 rotate integrally with the rotational shaft 3.

The high-pressure stage impeller 21 has a diameter larger than the above mentioned diameter of the low-pressure stage impeller 11. Thus, the high-pressure stage compressor 20 has a larger pressure ratio than the low-pressure stage compressor 10. As described above, if the low-pressure stage impeller 11 has a larger diameter than the high-pressure stage impeller 21, the pressure ratio of the high-pressure stage impeller 21 is smaller than that of the low-pressure stage impeller 11.

A pair of bearings 40R, 40L is disposed in the middle of the rotational shaft 3 in the longitudinal direction, spaced from each other in the axial direction. The bearings 40R, 40L are roller bearings of grease type. The bearing 40L on the side of the high-pressure stage compressor 20, from among the bearings 40R, 40L, is disposed in a bearing housing 50.

The bearing housing 50 is formed into an annular shape, and has an insertion hole 50a in the middle, into which the rotational shaft 3 can be inserted, as well as a bearing mounting hole 50b disposed on the low-pressure-stage-compressor 10 side of the insertion hole 50a, which has a larger diameter than the insertion hole 50a. The bearing 40L is mounted to the bearing mounting hole 50b, and the rotational shaft 3 is inserted into the bearing 40L, so that the rotational shaft 3 is supported rotatably via the bearing 40L. A protruding stepped portion 51 having an annular shape in a side view is disposed on the high-pressure-stage-compressor 20 side of the bearing housing 50, being fittable into the insertion opening 28 of the high-pressure stage housing 26, and a surface portion 52 of an annular shape is disposed radially outside the protruding stepped portion 51, facing and contacting the side face 26a of the high-pressure stage housing 26. The bearing housing 50 is fixed integrally to the high-pressure stage housing 26 via a bolt 53 inserted through the high-pressure stage housing 26.

A side face 54 of the bearing housing 50 on the side of the low-pressure stage compressor 10 has an engaging recess portion 54a having a circular shape in a side view. An end portion of the motor housing 45 on the side of the high-pressure stage compressor 20 is inserted into the engaging recess portion 54a.

Further, a rotor space part 45b that surrounds the electric motor rotor 30 rotatably is disposed on the bearing-housing 50 side of the motor housing 45, and a bearing mounting hole 45c to mount the bearing 40R is disposed between the rotor space part 45b and the low-pressure stage compressor 10. With the rotational shaft 3 inserted through the electric motor rotor 30 and the bearing 40R while the electric motor rotor 30 is disposed in the rotor space part 45b and the bearing 40R is disposed in the bearing mounting hole 45c, the rotational shaft 3 is rotatably supported and is rotatable in response to a driving force from the electric motor rotor 30. A plurality of fins 46 extending radially outward is disposed on an outer periphery of the motor housing 45, which makes it possible to dissipate heat generated by the electric motor rotor 30 and the bearing 40R, for instance.

The electric motor rotor 30 is a rotor of an electric motor, configured to rotate the rotational shaft 3 by receiving a driving force with a motor coil (not depicted), and is capable of rotating at a high speed. Operation of the electric motor rotor 30 and the motor coil is controlled by a motor controller 74 described below.

Next, operation of the multi-stage electric centrifugal compressor 1 will be described. When the electric motor rotor 30 is driven, the low-pressure stage impeller 11 and the high-pressure stage impeller 21 rotate along with rotation of the rotational shaft 3. In response to rotation of the low-pressure stage impeller 11, intake air enters through the inlet 17a of the low-pressure stage compressor 10, flows through the flow channel 17c inside the low-pressure stage compressor 10 to be compressed to a predetermined pressure ratio, and exits through the outlet 17b.

Intake air discharged from the outlet 17b flows through the intake-air communication passage 29 to flow into the high-pressure stage compressor 20 through the inlet 27a of the high-pressure stage compressor 20. Intake air enters the high-pressure stage compressor 20, flows through the flow channel 27c inside the high-pressure stage compressor 20 to be compressed further to a predetermined pressure ratio, and then exits through the outlet 27b.

As described above, in the multi-stage electric centrifugal compressor 1, intake air compressed by the low-pressure stage compressor 10 and intake air compressed by the high-pressure stage compressor 20 have different pressure ratios. Thus, by utilizing a difference in supercharging efficiency between the low-pressure stage compressor 10 and the high-pressure stage compressor 20 at a certain rotation speed, it is possible to differentiate change rates of respective compression ratios of the low-pressure stage compressor 10 and the high-pressure stage compressor 20 when the rotation speed is increased or decreased from the certain rotation speed, and to change the compression ratio of the multi-stage electric centrifugal compressor 1 gradually. Thus, it is possible to obtain the multi-stage electric compressor 1 capable of readily performing an optional compression-ratio control.

Further, in the multi-stage electric centrifugal compressor 1, intake air compressed by the low-pressure stage compressor 10 and intake air compressed by the high-pressure stage compressor 20 have different pressure ratios, and thus, when the low-pressure stage impeller 11 of the low-pressure stage compressor 10 and the high-pressure stage impeller 21 of the high-pressure stage compressor 20 rotate, a difference in inertia between the high-pressure stage compressor 20 with a larger pressure ratio and the low-pressure stage compressor 10 with a smaller pressure ratio may be inertia that acts on the rotational shaft 3 due to a braking effect, and thereby it is possible to reduce inertia. Thus, it is possible to obtain the multi-stage electric compressor 1 capable of readily controlling rotation of the electric motor rotor 30.

Next, the supercharging system of the internal combustion engine equipped with the above described multi-stage electric centrifugal compressor 1 will be described with reference to FIGS. 1 and 2. In the present embodiment, an engine will be described as an example of an internal combustion engine. In a supercharging system of the engine 60, as depicted in FIG. 2, an outlet side of the high-pressure stage compressor 20 of the multi-stage electric centrifugal compressor 1 is connected to an intake side of a turbocharger 62. The turbocharger 62 includes an exhaust turbine 63 rotated by exhaust gas of the engine 60, and a centrifugal compressor 65 which rotates in response to rotation of the exhaust turbine 63. A discharge pressure of the high-pressure stage compressor 20 of the multi-stage electric centrifugal compressor 1 is supplied via an intake passage 64b so as to be introduced into an intake side of the centrifugal compressor 65 of the turbocharger 62.

The intake passage 64b disposed upstream of the turbocharger 62 communicates with the outlet 27c of the high-pressure stage compressor 20 of the multi-stage electric centrifugal compressor 1. The centrifugal compressor 65 of the turbocharger 62 communicates with an intake side of the engine 60 via an intake passage 64c, and the exhaust turbine 63 of the turbocharger 62 communicates with an exhaust side of the engine 60 via an exhaust passage 61. The multi-stage electric centrifugal compressor 1 is as described above and not described again.

An intake-pressure sensor 70 for detecting a pressure of intake air flowing through the intake passage 64c is disposed in the intake passage 64c. An intake flow rate sensor for detecting an intake flow rate may be used instead of the intake-pressure sensor 70. The intake-pressure sensor 70 is electrically connected to an engine controller 71 which controls operation (ignition timing or fuel supply amount) of the engine 60. The engine controller 71 sets a target intake amount and a fuel injection amount of intake air to be supplied to the engine 60 in accordance with a signal of an accelerator opening-degree sensor 72 (a sensor which outputs a signal proportionally related to a press-down amount of a non-depicted accelerator pedal), and controls operation of the multi-stage electric centrifugal compressor 1 and a fuel injection device (not depicted) so as to achieve the set target intake amount and fuel injection amount.

The engine controller 71 sets a target intake amount and sends a signal corresponding to the target intake amount to a matching unit 73. The matching unit 73 includes a map 73a pre-storing a relationship between a required rotation speed of the electric motor rotor 30 and a discharge flow rate of the multi-stage electric centrifugal compressor 1, and derives the required rotation speed of the electric motor rotor 30 corresponding to a target intake amount supplied from the engine controller 71. A signal corresponding to the derived required rotation speed of the electric motor rotor 30 is sent to a motor controller 74 which controls rotation of the electric motor rotor 30. The motor controller 74 controls rotation of the electric motor rotor 30 so as to achieve a required rotation speed of the electric motor rotor 30 sent from the matching unit 73.

According to the supercharging system of the engine 60, in response to operation of the engine 60, exhaust air discharged from the engine 60 passes through the exhaust passage 61 to rotate the exhaust turbine 63, and the centrifugal compressor 65 compresses intake air in response to the rotation of the exhaust turbine 63 to supercharge intake air to the engine 60. Further, intake air taken in through the intake passage 64a connected to the low-pressure stage compressor 10 of the multi-stage electric centrifugal compressor 1 enters through the inlet 27a of the low-pressure stage compressor 10 to be compressed by the low-pressure stage compressor 10 to reach a predetermined pressure and to be discharged through the outlet 17b, flows through the intake-air communication passage 29 to be supplied to the high-pressure stage compressor 20, and gets compressed further by the high-pressure stage compressor 20 to an even higher pressure. This intake air with a high pressure flows through the intake passage 64b connecting the high-pressure stage compressor 20 and the centrifugal compressor 65 to be supplied to the centrifugal compressor 65, and intake air with an even higher pressure flows through the intake passage 64c connecting the centrifugal compressor 65 and the engine 60 to be supplied to the engine 60.

Now, the required rotation speed of the electric motor rotor 30 of the multi-stage electric centrifugal compressor 1 is derived by a matching unit selecting a required rotation speed of the electric motor rotor 30 which corresponds to the target intake amount from a map, so that the engine controller achieves a target intake amount as described above. Thus, the electric motor rotor 30 rotates at the derived required rotation speed, which makes it possible to supply the engine 60 with a target intake amount of intake air.

Further, the supercharging system of the engine 60 of the present embodiment compresses intake air with three-stage compressors 10, 20, 65, and thereby it is possible to supply intake air with an even higher pressure to the engine 60 than in a case two-stage compressors are used to compress intake air. Thus, even if the rotation speed of the multi-stage electric centrifugal compressor 1 is reduced, it is possible to achieve a desired pressure for intake air to be supercharged to the engine 60. Accordingly, it is possible to prevent a decrease in the lifetime of the multi-stage electric centrifugal compressor.

Further, if the multi-stage electric centrifugal compressor 1 is driven at the maximum rotation speed, intake air with an even higher pressure can be supercharged to the engine 60, and thereby it is possible to further improve responsiveness during low-speed operation, and to achieve high output and reduced fuel consumption during normal operation. Further, the multi-stage electric centrifugal compressor 1 can control rotation of the electric motor rotor 30 readily regardless of the operational state of the engine 60, and thus it is possible to achieve improvement of responsiveness during low-speed operation of the engine 60 and an assist function of the turbocharger 62, as well as facilitated control of rotation speed of the rotational shaft 3 with the electric motor rotor 30 when assist for the turbocharger 62 is required also during normal operation. Thus, intake air of pressure corresponding to demand can be supplied to the engine 60 via the turbocharger 62.

The embodiments of the present invention have been described above. However, the present invention is not limited thereto, and various modifications may be applied as long as they do not depart from the object of the present invention. For instance, some of the above described embodiments may be combined upon implementation.

DESCRIPTION OF REFERENCE NUMERAL

1 Multi-stage electric centrifugal compressor
3, 66 Rotational shaft
10 Low-pressure stage compressor
11 Low-pressure stage impeller (impeller)
12, 22 Back plate 13, 23 Boss portion
13a, 23a Through hole
14, 24 Vane
15 Nut
16 Low-pressure stage housing
16a, 26a, 54 Side face
17, 27 Space part
17a, 27a Inlet
17b, 27b Flow channel
17c, 27c Outlet
18, 28 Insertion opening
20 High-pressure stage compressor
21 High-pressure stage impeller (impeller)
26 High-pressure stage housing
29 Intake-air communication passage
30 Electric motor
35 Back plate
40R, 40L Bearing
45b Motor housing
45a, 50a Insertion hole
45b Motor mounting hole
45c, 50b Bearing mounting hole
46 Fin
50 Bearing housing
51 Protruding stepped portion
52 Surface portion
53 Bolt
54a Engaging recess portion
60 Engine (Internal combustion engine)
61 Exhaust passage
62 Turbocharger
63 Exhaust turbine
64 Intake passage
65 Centrifugal compressor
70 Intake-pressure sensor
71 Engine controller (upper-level controller)
72 Accelerator opening-degree sensor
73 Matching unit
74 Motor controller (Controller)

The invention claimed is:

1. A multi-stage electric centrifugal compressor for pressurizing intake air to be supplied to an internal combustion engine, comprising:
   an electric motor; and
   a pair of centrifugal compressors coupled to either side of the electric motor, the pair of centrifugal compressors comprising a low-pressure stage compressor and a high-pressure stage compressor connected in series;
   wherein the low-pressure stage compressor and the high-pressure stage compressor are formed to have different pressure ratios from each other; and
   wherein the multi-stage electric centrifugal compressor further comprises
      a flow rate sensor that detects an actual flow rate of an intake air supplied to the internal combustion engine;
      an engine controller that outputs a target intake amount based on the detected actual flow rate;
      a matching unit, including a map defining a relationship between a required rotation speed of the electric motor and a flow rate of the multi-stage electric centrifugal compressor, and deriving the required rotation speed of the electric motor corresponding to the target intake amount;
      a rotation speed sensor that detects an actual rotation speed of the electric motor; and
      a motor controller controlling the electric motor to have the actual rotation speed of the electric motor achieving the required rotation.

2. The multi-stage electric centrifugal compressor according to claim 1, wherein a diameter of an impeller of the low-pressure stage compressor is different from a diameter of an impeller of the high-pressure stage compressor.

3. The multi-stage electric centrifugal compressor according to claim 1, wherein a shape of an impeller of the low-pressure stage compressor is different from a shape of an impeller of the high-pressure stage compressor.

4. A supercharging system of an internal combustion engine,
   wherein a discharge side of the multi-stage electric centrifugal compressor according to claim 1 is connected to an intake side of another supercharger; and
   wherein discharged air of the multi-stage electric centrifugal compressor is taken into an intake side of a centrifugal compressor of the turbocharger.

5. The supercharging system of an internal combustion engine according to claim 4, wherein the other supercharger comprises an exhaust turbine rotated by exhaust gas of an internal combustion engine and the centrifugal compressor rotated by rotation of the exhaust turbine.

* * * * *